United States Patent
Larson

(10) Patent No.: US 10,680,987 B2
(45) Date of Patent: Jun. 9, 2020

(54) PROXIMITY DISCOVERY SYSTEM AND METHOD

(71) Applicant: Plexus Meet, Inc., La Habra, CA (US)

(72) Inventor: Erika Larson, La Habra, CA (US)

(73) Assignee: Plexus Meet, INC., La Habra, CA (US)

( * ) Notice: Subject to any disclaimer, the term of this patent is extended or adjusted under 35 U.S.C. 154(b) by 0 days.

(21) Appl. No.: 16/364,564

(22) Filed: Mar. 26, 2019

(65) Prior Publication Data

US 2019/0222546 A1 Jul. 18, 2019

Related U.S. Application Data

(63) Continuation of application No. 16/006,271, filed on Jun. 12, 2018, now Pat. No. 10,250,542, which is a continuation of application No. 15/651,869, filed on Jul. 17, 2017, now Pat. No. 10,027,616.

(60) Provisional application No. 62/363,751, filed on Jul. 18, 2016, provisional application No. 62/500,061, filed on May 2, 2017.

(51) Int. Cl.
| | |
|---|---|
| *H04W 4/21* | (2018.01) |
| *H04W 4/70* | (2018.01) |
| *H04L 12/58* | (2006.01) |
| *H04W 4/02* | (2018.01) |
| *H04L 29/08* | (2006.01) |
| *H04W 4/12* | (2009.01) |
| *H04W 4/80* | (2018.01) |

(52) U.S. Cl.
CPC ............. *H04L 51/20* (2013.01); *H04L 51/32* (2013.01); *H04L 67/306* (2013.01); *H04W 4/023* (2013.01); *H04W 4/12* (2013.01); *H04W 4/21* (2018.02); *H04W 4/80* (2018.02)

(58) Field of Classification Search
CPC .......... H04W 4/21; H04W 4/02; H04W 4/70; H04L 51/20; H04M 3/42
USPC ........................................ 455/414.1, 456.2
See application file for complete search history.

(56) References Cited

U.S. PATENT DOCUMENTS

| | | | |
|---|---|---|---|
| 6,009,103 | A | 12/1999 | Woundy |
| 6,968,179 | B1 | 11/2005 | De Vries |
| 7,254,406 | B2 | 8/2007 | Beros et al. |
| 7,509,093 | B2 | 3/2009 | Persson et al. |
| 7,643,833 | B2 | 1/2010 | Sankisa |
| 7,724,705 | B2 | 5/2010 | Erola et al. |
| 7,877,082 | B2 | 1/2011 | Eagle et al. |

(Continued)

FOREIGN PATENT DOCUMENTS

| | | |
|---|---|---|
| EP | 1133119 | 9/2001 |
| WO | 2016/118690 | 7/2016 |

*Primary Examiner* — William D Cumming
(74) *Attorney, Agent, or Firm* — Ziegler IP Law Group LLC

(57) ABSTRACT

A proximity discovery system enabling a person to quickly and efficiently discover colleagues within their proximity without visual contact. The system comprises a mobile computing device including an antenna and transceiver for exchanging messages with a plurality of other mobile devices nearby the user device, a user detection module for detecting the messages from the other mobile devices, a proximity detector for estimating a distance between the user device and each of the mobile devices, a connection module for sharing biographic and professional information with the plurality of mobile devices based on one of a plurality of connection levels.

22 Claims, 7 Drawing Sheets

(56) References Cited

U.S. PATENT DOCUMENTS

| | | |
|---|---|---|
| 7,965,981 B2 | 6/2011 | Bloebaum et al. |
| 8,010,131 B2 | 8/2011 | Rothschild |
| 8,014,763 B2 | 9/2011 | Hymes |
| 8,072,954 B2 | 12/2011 | Shen et al. |
| 8,311,478 B2 | 11/2012 | Bloebaum et al. |
| 8,538,458 B2 | 9/2013 | Haney |
| 8,583,038 B2 | 11/2013 | Bloebaum et al. |
| 8,643,625 B2 | 2/2014 | Kruglick |
| 8,670,935 B2 | 3/2014 | Griffin et al. |
| 8,682,302 B2 | 3/2014 | De Vries |
| 8,694,024 B2 | 4/2014 | Ng et al. |
| 8,712,455 B2 | 4/2014 | Gosset et al. |
| 8,750,850 B2 | 6/2014 | Gupta |
| 8,781,498 B2 | 7/2014 | Rothschild |
| 8,798,593 B2 | 8/2014 | Haney |
| 8,804,527 B2 | 8/2014 | Pollari |
| 8,831,635 B2 | 9/2014 | Haney |
| 8,838,152 B2 | 9/2014 | Tang et al. |
| 8,914,024 B2 | 12/2014 | Alharayeri |
| 8,914,070 B2 | 12/2014 | Wassingbo |
| 8,918,050 B2 | 12/2014 | Gormley et al. |
| 9,042,827 B2 | 5/2015 | Roper et al. |
| 9,084,089 B2 | 7/2015 | Ng et al. |
| 9,131,335 B2 | 9/2015 | Huttunen et al. |
| 9,148,760 B2 | 9/2015 | Pollari |
| 9,179,261 B2 | 11/2015 | De Vries |
| 9,191,775 B2 | 11/2015 | French et al. |
| 9,207,853 B2 | 12/2015 | Lee et al. |
| 9,232,348 B2 | 1/2016 | Huttunen et al. |
| 9,247,518 B2 | 1/2016 | Venkatraman et al. |
| 9,253,288 B2 | 2/2016 | Binenstock |
| 9,253,616 B1 | 2/2016 | Haney |
| 9,369,411 B2 | 6/2016 | Granito et al. |
| 9,374,770 B2 | 6/2016 | Park et al. |
| 9,398,436 B2 | 7/2016 | Princen et al. |
| 9,572,009 B2 * | 2/2017 | Zhu ................... H04W 4/70 |
| 9,680,529 B2 | 6/2017 | Coelho et al. |
| 9,763,030 B2 | 9/2017 | Huttunen et al. |
| 10,027,616 B2 * | 7/2018 | Larson ................ H04L 51/20 |
| 10,250,542 B2 * | 4/2019 | Larson ................ H04L 51/20 |
| 2002/0183068 A1 | 12/2002 | Dunko et al. |
| 2005/0251448 A1 | 11/2005 | Gropper |
| 2006/0084381 A1 | 4/2006 | Hartwig |
| 2006/0172770 A1 | 8/2006 | Fyke et al. |
| 2007/0072582 A1 | 3/2007 | Nurmi |
| 2007/0141989 A1 | 6/2007 | Flinchem |
| 2009/0191849 A1 | 7/2009 | Fioretti et al. |
| 2009/0323655 A1 | 12/2009 | Cardona et al. |
| 2010/0022187 A1 | 1/2010 | Ohkita |
| 2010/0057875 A1 * | 3/2010 | Bychkov ............. G06Q 50/24 709/206 |
| 2010/0115426 A1 | 5/2010 | Liu et al. |
| 2010/0136910 A1 | 6/2010 | Lee et al. |
| 2010/0248744 A1 * | 9/2010 | Bychkov ............. H04W 4/02 455/456.2 |
| 2011/0028129 A1 * | 2/2011 | Hutchison ........... H04M 3/42 455/414.1 |
| 2011/0307380 A1 | 12/2011 | Ido |
| 2013/0103946 A1 | 4/2013 | Binenstock |
| 2014/0113558 A1 | 4/2014 | Varoglu et al. |
| 2014/0194148 A1 | 7/2014 | Griffin et al. |
| 2014/0206290 A1 | 7/2014 | Lee |
| 2014/0342667 A1 | 11/2014 | Aarnio |
| 2015/0004912 A1 | 1/2015 | Diamond et al. |
| 2015/0056920 A1 | 2/2015 | Huttunen et al. |
| 2015/0057020 A1 | 2/2015 | Moldavsky et al. |
| 2015/0171926 A1 | 6/2015 | Coelho et al. |
| 2015/0223013 A1 | 8/2015 | Park et al. |
| 2015/0334517 A1 | 11/2015 | Huttunen et al. |
| 2016/0073352 A1 | 3/2016 | Baron et al. |
| 2016/0080921 A1 | 3/2016 | Yadav et al. |
| 2016/0154084 A1 | 6/2016 | Ogawa et al. |
| 2016/0174020 A1 | 6/2016 | Huttunen et al. |
| 2016/0323248 A1 * | 11/2016 | Zeira .................. H04W 4/21 |
| 2016/0330605 A1 * | 11/2016 | Zhu ................... H04W 4/70 |
| 2018/0019964 A1 * | 1/2018 | Larson ................ H04L 51/20 |
| 2018/0032997 A1 | 2/2018 | Gordon et al. |
| 2018/0295088 A1 * | 10/2018 | Larson ................ H04L 51/20 |
| 2019/0222546 A1 * | 7/2019 | Larson ................ H04L 51/20 |

* cited by examiner

PROXIMITY DISCOVERY SYSTEM AND METHOD

CROSS-REFERENCE TO RELATED APPLICATION

This patent application is a continuation application of Ser. No. 16/006,271, filed Jun. 12, 2018, which is a continuation of U.S. patent application Ser. No. 15/651,869, entitled "Proximity Discovery System and Method" filed Jul. 17, 2017, which claims the benefit of U.S. Provisional Patent Application Ser. No. 62/363,751, entitled "Mobile Application for Identifying and Processing Information Concerning Persons in Proximity," filed Jul. 18, 2016, and U.S. Provisional Patent Application Ser. No. 62/500,061, entitled "Mobile Application Utilizing Social Profile Photo Lookup in Conjunction with Business Card Scan," filed May 2, 2017, which applications are incorporated in their entirety here by this reference.

TECHNICAL FIELD

This invention relates to a system and method for enabling users to virtually discover other people in the near proximity, virtually connect with those people, and automatically exchange professional and/or personal information with those people before actually meeting those other people and without manually exchanging information with those people.

BACKGROUND

People frequently attend professional conferences for the purpose of networking which may include meeting with known colleagues as well as making new contacts. When meeting new contacts, it is customary to exchange business cards and other information, for example. These professional conferences may, however, be attended by thousands of people and the event spread out across a large conference hall, or multiple conference halls. It becomes difficult to meet known colleagues, and even more challenging to identify new people of interest, because the probability of encountering these people goes down as the size of the event increases. It is quite possible to be standing meters away from a colleague and be completely unaware of the colleague's presence because we rely so heavily on visional contact to make contact with colleague. While it is possible to use email, for example, to pre-arrange a time and place to meet a colleague, this solution does not scale well for a number of reasons. First, each meeting must be arranged individually, which becomes very cumbersome if one intends to meet a large number of people. Second, any pre-arrange meeting may turn out to actually conflict with presentations being offered at the professional conference. Third, a person may not even know whether or not a colleague with which they wish to meet is even attending the professional conference. For the foregoing reasons there is, therefore, a need for a system that enables people to effectively "discover", i.e., "detect", when colleagues are present at a professional gathering or other large event without relying on visual contact or email, enables people to make new connections with people of interest, and automatically exchanges professional information between those people with little or no manual data entry.

SUMMARY

The invention in some embodiments features a system and method for enabling users to quickly and efficiently discover friends and colleagues in crowded environments even when those people are not readily visible do to crowd size, obstacles, or distance. The system in one embodiment is a proximity discovery system comprising a user device and server. The user device comprises: an antenna and transceiver for exchanging messages with a plurality of mobile devices within approximately 100 meters of the user device, a user detection module for detecting discovery messages from the other mobile devices, a proximity detector for detecting the presence of people in the near vicinity and/or estimating a range or a distance between the user device and each of the mobile devices, a connection module for sharing biographic and professional information with the plurality of mobile devices based on one of a plurality of connection levels. At a first level, the users exchange a thumbnail portrait and/or a name, while at a second level they exchange more detailed professional data and contact data including, for example, social media user info and email addresses. The people in proximity of the user may be presented in the form of a proximity graphic comprising a name and image for each person associated with one of the plurality of mobile devices within approximately 100 meters of the user device, and indicia indicating the approximate distance from the user device to each of the plurality of mobile devices. In the preferred embodiment, the proximity discovery system uses the BLUETOOTH™ protocol to exchange messages but other protocols including WIFI and GPS (global positioning satellite) protocols may also be employed to locate and identify people of interest in proximity of a user.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
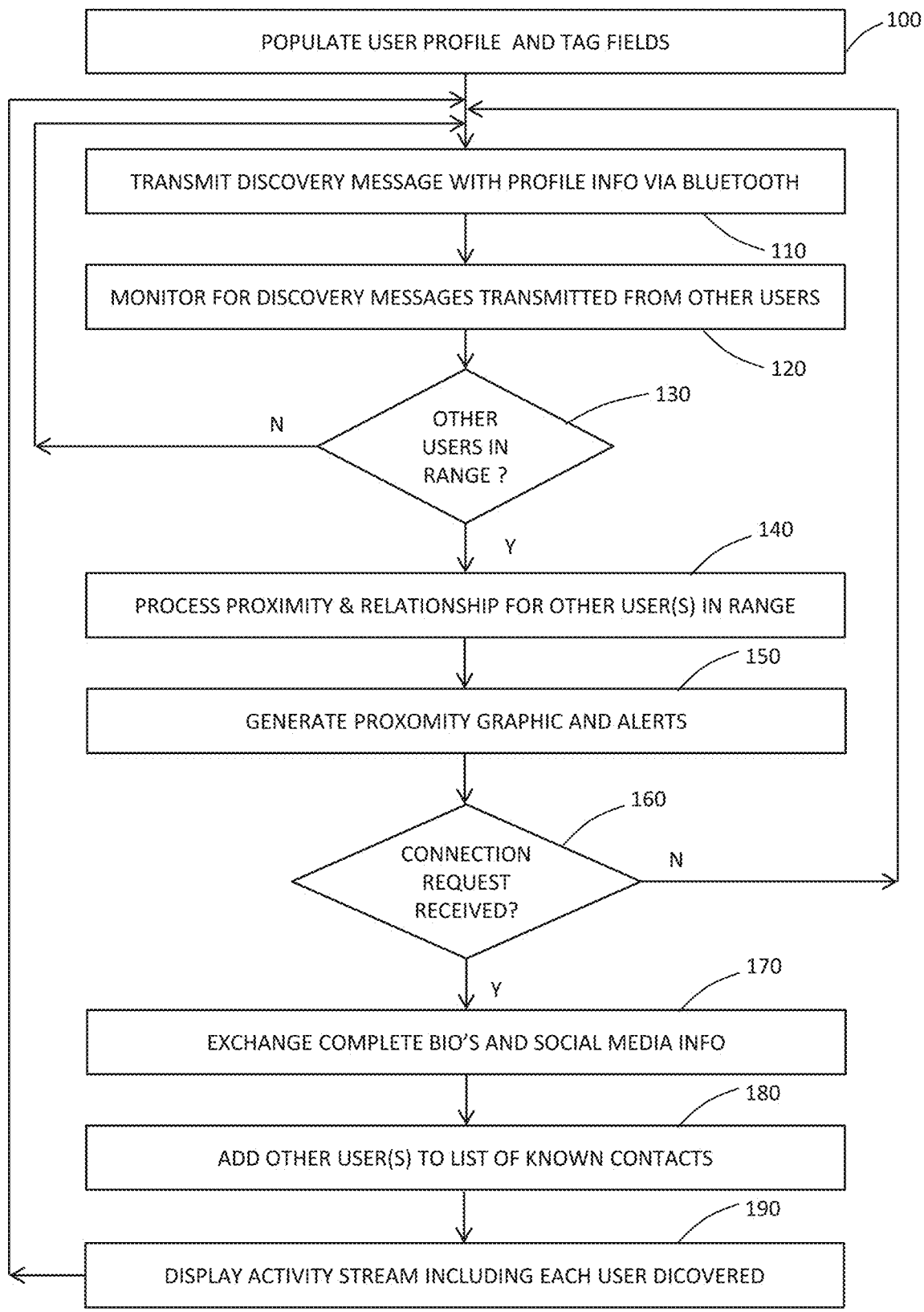
FIG. 1 is a flowchart of a method for the virtual discovery of people in the proximity of a user, in accordance with a preferred embodiment of the present invention.

FIG. 1 is a flowchart of a method for the virtual discovery of people in the proximity of a user using a mobile phone or other mobile computing device. The mobile phone is configured with a BLUETOOTH™ protocol which enables the mobile phone to exchange messages and other data with other devices that are in proximity of the mobile phone. These messages are configured to broadcast a notification of the presence of the user to other users.

The process begins with the user first populating 100 the proximity discovery software with his or her profile with biographic and/or professional information. This may include, but is not limited to, entering the user's name, profession or title, employer name or other professional affiliation, and a digital photo of the user. The information shared is comparable to the professional information typically listed on a business card, without the need to manually enter it in a contact list. Using their mobile phone or other computing device, the user effectively broadcasts or otherwise transmits 110 this profile information using the BLUETOOTH™ message. The message transmitting this profile information, which enables other people to discover the presence of the user, is referred to herein as a discovery message. At the same time, the mobile phone is continually monitoring 120 for discovery messages transmitted by other users in proximity to the user.

Figure 2:
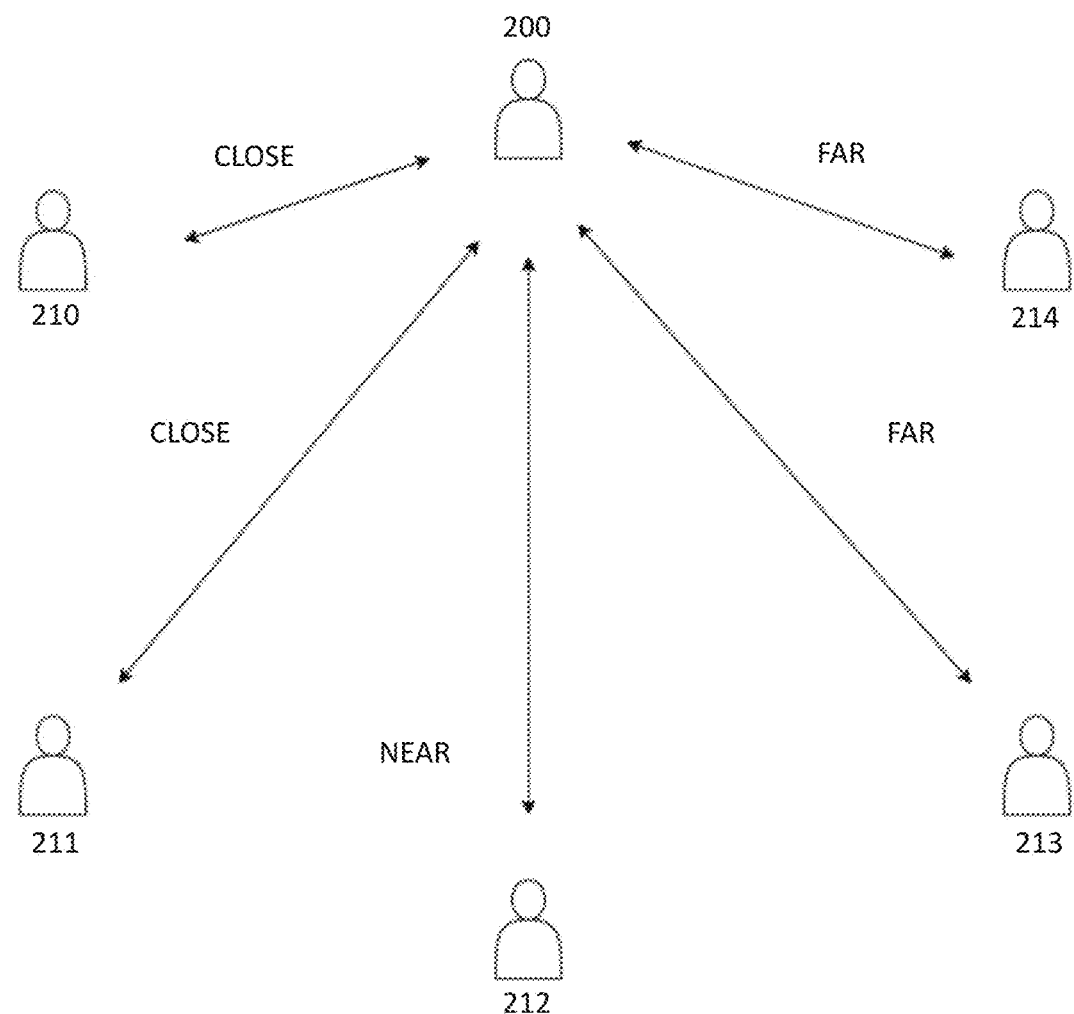
FIG. 2 is a diagrammatic illustration of a proximity graphic showing other people using a proximity discovery system in the vicinity of the user, in accordance with a preferred embodiment of the present invention.

If the user's mobile phone detects discovery messages from other users, i.e., collocated users, in the immediate area, decision block 130 is answered in the affirmative. Thereafter, the user's mobile phone or a remote server, for example, determines 140 the proximity and relationship of the collocated users in proximity of the user. Proximity may be generated 150 and reported qualitatively in terms of the (a) "nearness" of the other user, or quantitatively in terms of the (b) a map with a precise distance away and a bearing indicating the heading pointing to the collocated user, (c) precise global positioning satellite (GPS) coordinates of the collocated user, or (d) a combination thereof. In the preferred embodiment, the proximity of collocated users is illustrated graphically using an interface similar to the diagrammatic screen shot shown in FIG. 2. In FIG. 2, the user 200 is shown together with a plurality of collocated users 210-214. In some embodiments, the distance between the user and every collocated user is illustrated by one of three coarse metrics, namely, "close", "near", and "far". The metric therefore helps the user to gauge where to look when attempting to find the other users. In other embodiments, a geo-location diagram (map) may displayed to indicate where two users first became connected. The map may be a street map with general intersections and general city location.

In some embodiments, the distance to collocated users is dynamically updated by means of a real-time feed generated by the user's mobile phone and the collocated users sorted based on proximity, preferably with closest users shown at the left and farthest users shown at the right. In the preferred embodiment, the distance to a collocated user is estimated based upon the strength of the BLUETOOTH™ signal detected from the other user. A strong signal strength suggests close proximity while a weak signal strength indicates a large separation distances. The interface may further include a "recent encounters" feed that tracks the user's proximity to other users although not in real-time. This tracks the user's history so the user can still see the thumbnail image for the other users and subsequently connect with those users at a later date if the user failed to connect with those people at the first opportunity.

Referring to FIG. 1 again, the user mobile device may also be configured to generate 150 "alerts" to the user when a predetermined condition is satisfied. For example, an alert may be configured to notify the user when (a) a specific person has been detected in proximity to the user, (b) when a person of a specific profession has been detected in proximity to the user, or (c) when a person affiliated with a specific employer or entity has been detected in proximity to the user. The alert may take the form of a visual message or audible tone generated immediately after detection of the person of interest.

Once the presence of other users has been detected and presented to the user by way of the interface in FIG. 2, a user may then select one or more collocated users with which to "connect". If the user, "clicks" on a collocated user in FIG. 2, for example, decision block 160 in FIG. 1 is answered in the affirmative and the user's complete profile and social media account information automatically transmitted to the collocated user. If the user has included a FACEBOOK™ or LINKEDIN ™ account in their personal profile, for example, that information is transmitted 170 to the other user to facility further communication between the users. Thereafter, the users may communicate one-to-one by means of instant messages or direct messages using the FACEBOOK™ or LINKEDIN™ platforms, or by means of an instant messaging functionality embedded in the proximity discovery software app itself. Users may, for example, then make arrangements to meet face-to-face, schedule meetings, or even conduct business. In the case of a meeting, the user's mobile phone may be configured to extract the scheduling information from the instant message exchange and automatically add the meeting to the user's calendar along with a reminder just before the meeting is to occur.

In addition to the exchange of social media info, the user's mobile phone is preferably configured to generate 180 a new contact for the collocated user in the user's list of contacts. Thereafter, the user's mobile phone is configured to generate 190 an "activity stream" illustrating each collocated user that has been seen, as well as the time and day and location each of those collocated users was seen.

Figure 3:
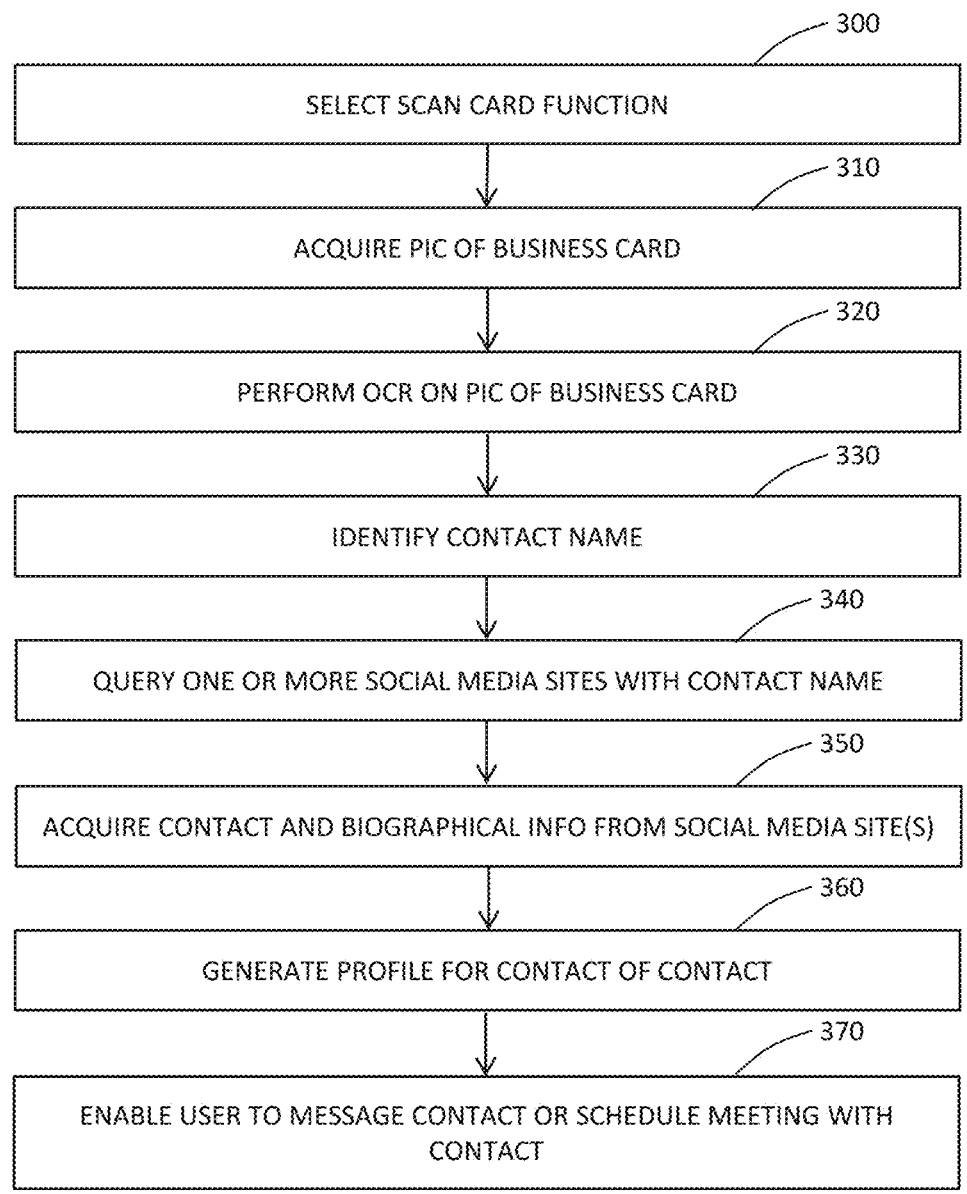
FIG. 3 is flowchart of a method for automatically exchanging information with people in the proximity of a user using OCR, in accordance with a preferred embodiment of the present invention.

Illustrated in FIG. 3 is flowchart of a method for automatically exchanging information with people in the proximity of a user. In accordance with some embodiments of the present invention, the proximity detection software is also configured with optical character recognition (OCR) functionality that enables users to easily add contact information to their mobile phones, for example, without manual data entry. In one embodiment, a user may use the present invention to select 300 a "scan card" function. When activated, the user is prompted to acquire 310 a digital photograph of another person's business card using their mobile phone's built-in camera, for example. The photo is then processed 320 using OCR to extract information about the name, business, and contact info of the person associated with the business card. The name of the person in particular may be identified 330 from the extract info and the name used to query 340 one or more social media sites for additional contact information as well as relevant biographical information and one or more photographs of the person. The additional information retrieved 350 from the social media websites may then be automatically compiled 360 to form a profile in a contact list maintained by the proximity discovery system, the profile of the new contact including a photo retrieved from their social media page or account. Thereafter, the users may communicate 370 directly using a messaging tool in the proximity discovery system or any one of the social media platforms.

Figure 4:
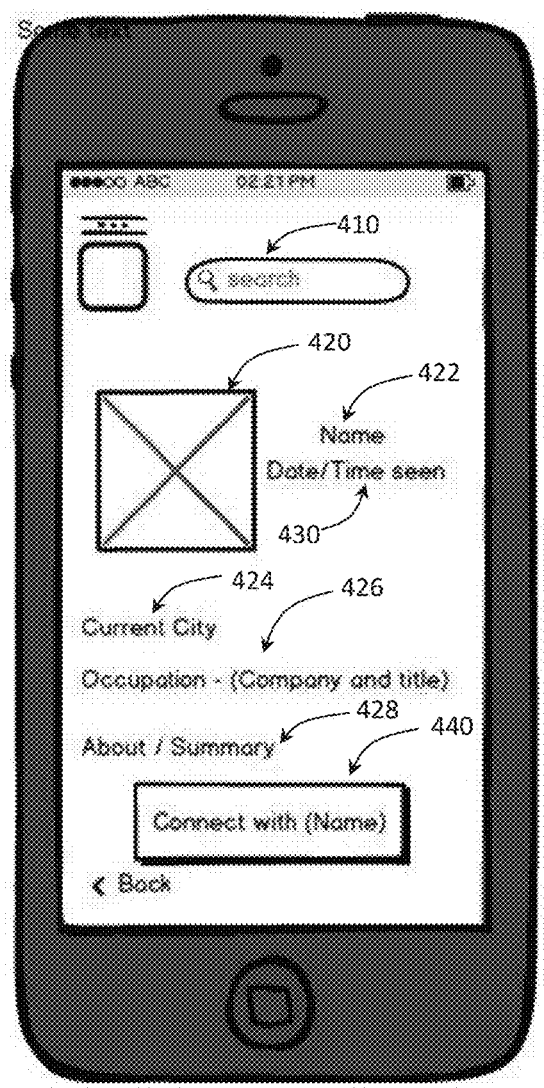
FIG. 4 is a representative screen shot illustrating a user's own profile page, in accordance with a preferred embodiment of the present invention.

FIG. 4 is a diagrammatic screen shot illustrating a user's own profile page, which includes a field 420 to upload a picture, a field 422 to enter one's user name, a field 424 to enter the user's current city of residence, a field 426 to enter the user's occupation along with employer and title, and a field 428 to enter a short statement about the user. The profile page further includes a search field 410 for performing a keyword search of the page and or the proximity discover app, a field 430 indicating the last time the profile was seen, and the name, nickname or handle 440 to be seen by other users.

Figure 5:
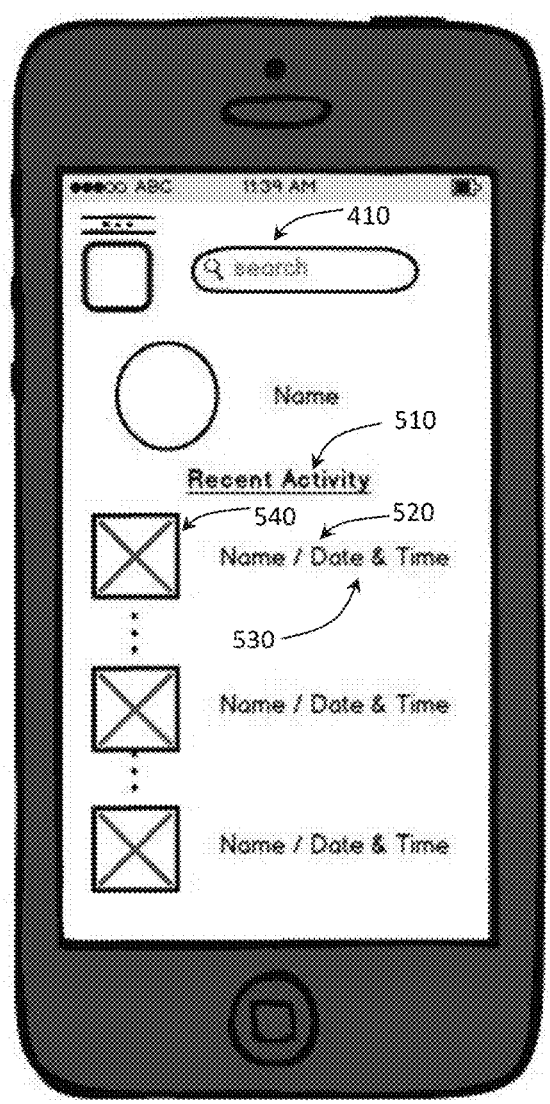
FIG. 5 is a representative screen shot illustrating people with which the user has recently connected, in accordance with a preferred embodiment of the present invention.

FIG. 5 is a diagrammatic screen shot illustrating collocated people with which the user has recently connected. The recent connections are listed in a column 510 titled "recent activity" followed by the name 520 of each person with which the user has connected, the date and time 530 of the connection, and a picture 540 provided by the other user or extracted from the person's social media account, for example.

Figure 6:
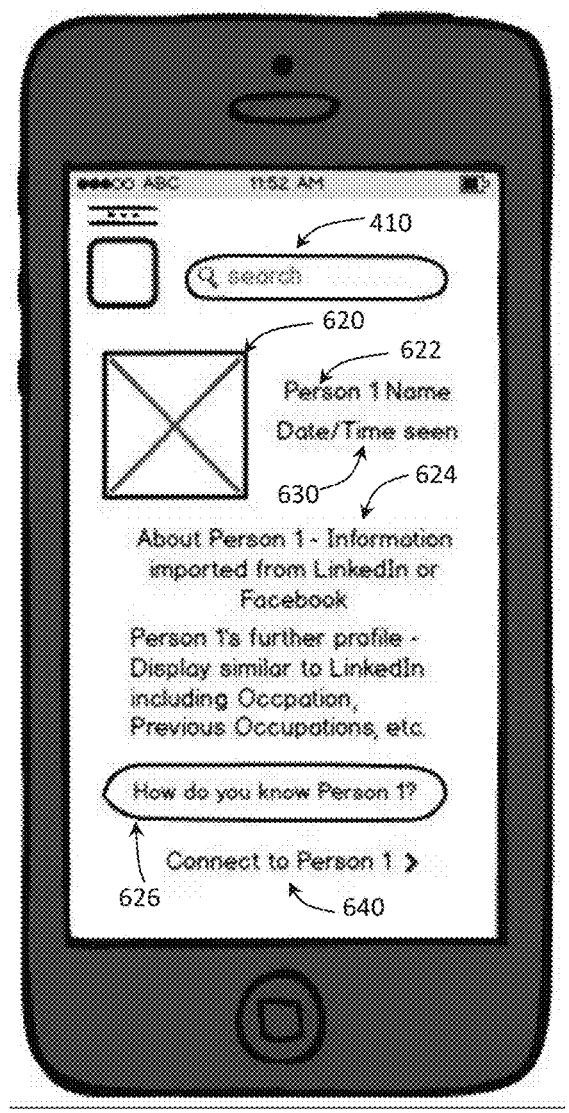
FIG. 6 is a representative screen shot illustrating contact information for a person with which the user has connected, in accordance with a preferred embodiment of the present invention.

FIG. 6 is a diagrammatic screen shot illustrating contact information for a collocated person with which the user has connected, which includes a picture of the contact 620, the name of the contact 622, the contact's profile information 624 including social media information and a professional description, a notation 626 indicating how the two know each other or became connected, and an indication 630 of the date and time this other user was seen or otherwise connected with. The interface further includes a search field 410 for conducting keyword searches of the app, and a link 640 with which to initiate contact with this other user, i.e., the collocated user.

Figure 7:
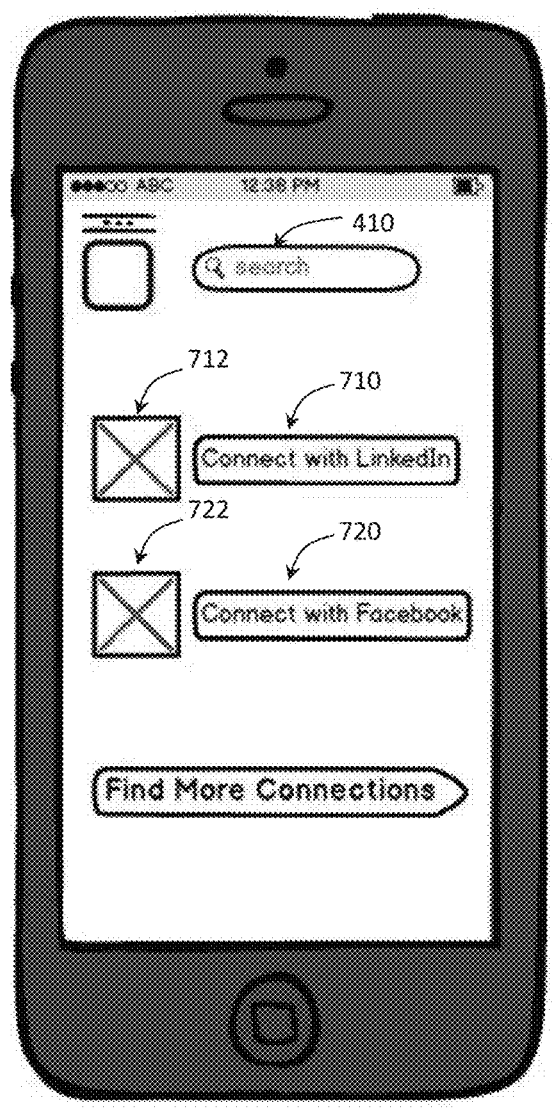
FIG. 7 is a representative screen shot illustrating an interface for initiating direct contact with other people via the proximity discovery system, in accordance with a preferred embodiment of the present invention.

FIG. 7 is a diagrammatic screen shot illustrating an interface for initiating direct contact with a collocated person via the proximity discovery system. To initiate contact, the user need only call up the interface listing the contacts and click on the person's picture or name, for example, corresponding to the particular social media account. In the present case, for example, the user can connect with the contact via LINKEDIN™ by clinking on the person's name 710 or picture 712. Similarly, the user can connect with the contact via FACEBOOK™ by clinking on the person's name 720 or image 722. In either case, an instant messenger application is launched and the user provided an interface for exchanging instant messages or direct messages.

Figure 8:
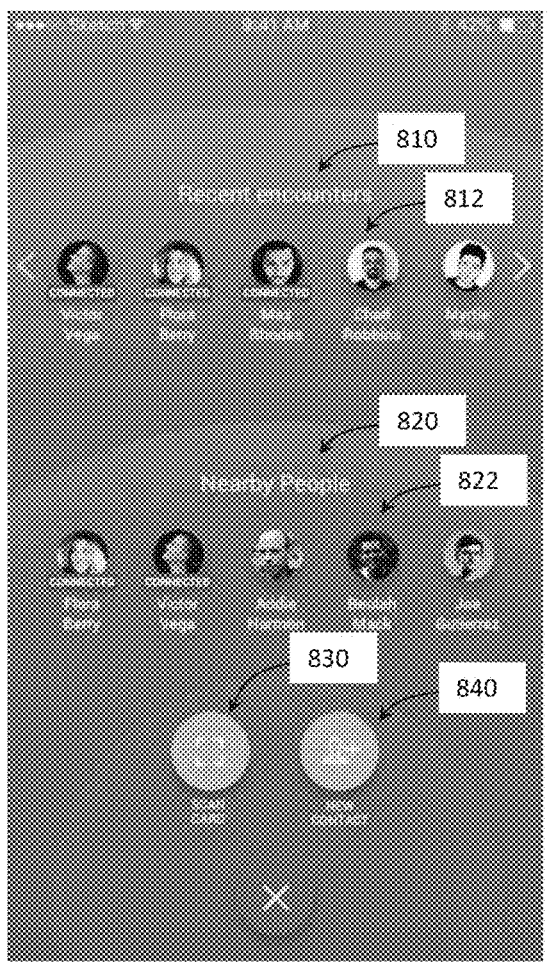
FIG. 8 is a diagrammatic screen shot illustrating a first group of people and a second group of people, in accordance with a second embodiment of the present invention.

FIG. 8 is a diagrammatic screen shot illustrating a first group of people and a second group of people, in accordance with a second embodiment of the present invention. The first group of people 812, organized under a first heading 810, includes thumbnail photos and associated names of a plurality of "recent encounters" along with hyperlinks to their contact information. Recent encounters are other users of the proximity detection system than have come within the range of the BLUETOOTH antenna and been detected in the proximity of the user within a predetermined period of time. That is, this first group of people 812 is a history of collocated users, which is compiled and maintained by the proximity discovery system. The list of recent encounters enables a user to subsequently see and contact other users long after they were first detected. This feature is particularly valuable if when a user needs to follow up and converse with a person they encountered days or weeks ago, but don't necessarily remember their name contact information, As such, a user can contact these people without the user necessarily collecting business cards from each of these people or even remembering their names.

The second group of people 822, organized under a second heading 820, includes thumbnail photos and associated names of a plurality of "nearby people". The second group of people are therefore currently in proximity, likely within 100 meters, of the user at that moment in time. Each person in the second group of people 822 is represented by a thumbnail photo and an associated name.

The screen shot in FIG. 8 further includes a "scan card" button and "new contact" button. The "scan card" but enables the user's mobile device to take a picture of a business card and extract relevant data which is then archived. The "new contact" button, when depressed, causes the proximity discovery system to generate and new contact file and populate it which known data acquired automatically via the BLUETOOTH™ connection or from the photo of the person, for example. In some case, the new contact file is populated with information and digital photo(s) retrieved from that person's social media page, e.g., their personal FACEBOOK™ page.

Figure 9:
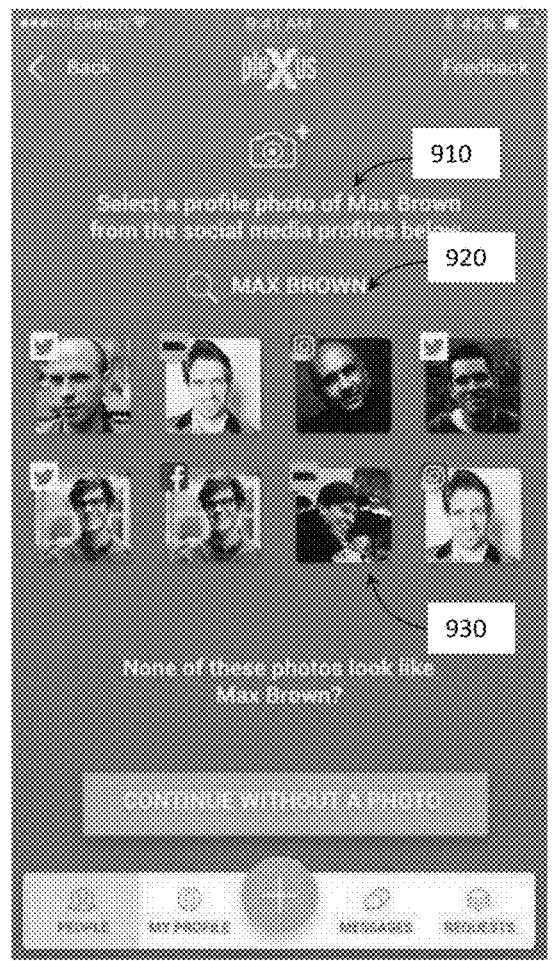
FIG. 9 is diagrammatic screen shot illustrating a page enabling a user to integrate social media data into a profile for a contact on the proximity discovery system, in accordance with a second embodiment of the present invention.

FIG. 9 is diagrammatic screen shot illustrating a page enabling a user to integrate social media data into a profile for a contact on the proximity discovery system, in accordance with a second embodiment of the present invention. The user is prompted with an instruction 910 to "select a profile photo" of a person, e.g., Max Brown, "from the social media profiles below". The name of the person 920, presently listed as Max Brown, is list together with the various thumbnail photos 930 acquired from Max Brown's social media web accounts.

Thereafter, the user selects one of the plurality 920 of photos captured from various social media accounts, and that selected photo becomes the profile photo associated with the profile in the user's list of contacts. After the photo for Max Brown is selected and the profile updated, the user may return to using the proximity discovery app in the manner discussed herein.

Figure 10:
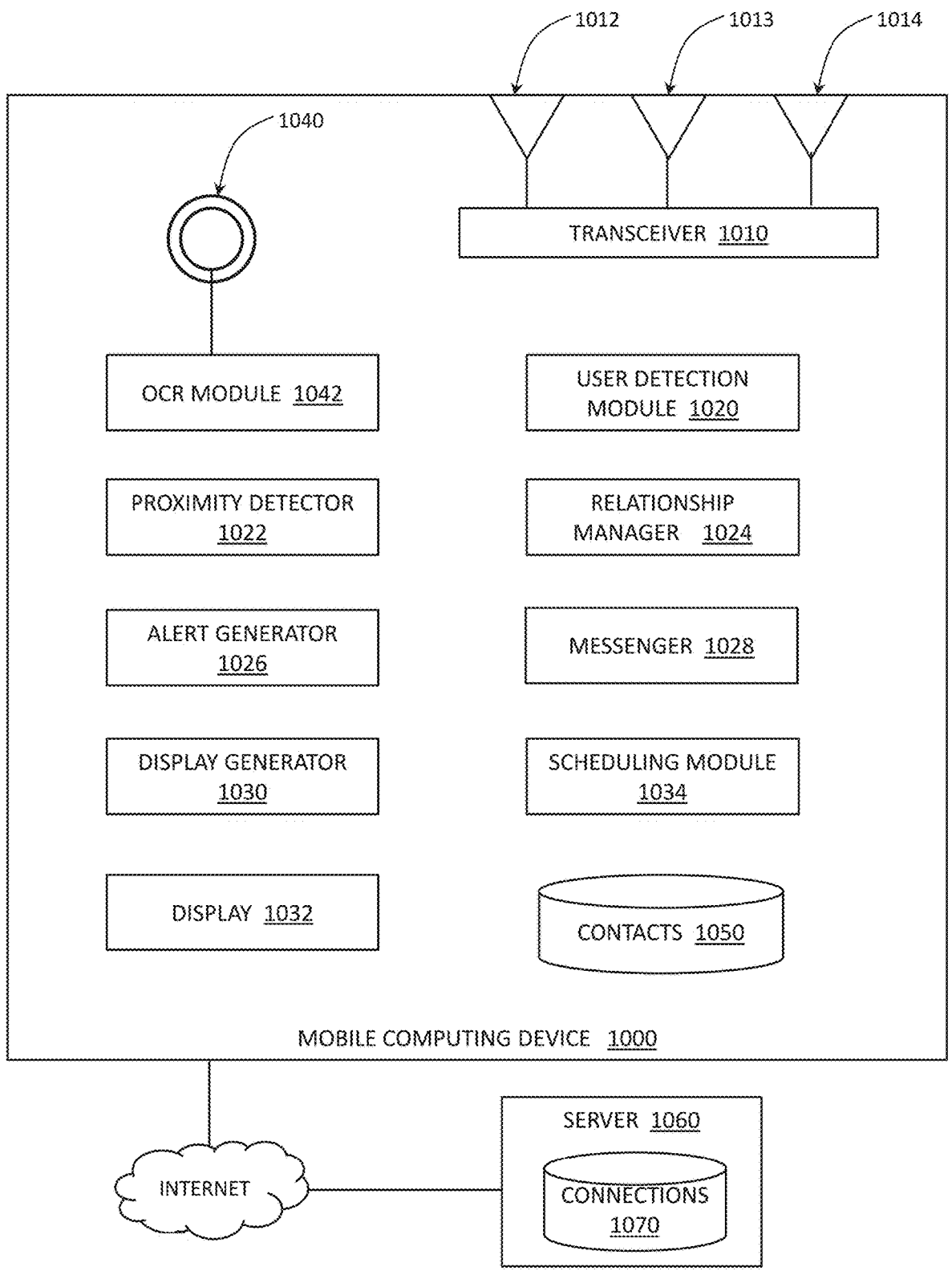
FIG. 10 is a functional block diagram of a system configured to enable the virtual discovery of people in the proximity of a user, and automatic exchange of information with people in the proximity of a user, in accordance with a preferred embodiment of the present invention.

Illustrated in FIG. 10 is a functional block diagram of the proximity discovery system for the discovery of people in the proximity of the user and the automatic exchange of information with those people. The proximity discovery system preferably includes a mobile phone 1000 or other mobile computing device as well as a remote server 1060 with a database 1070 of the connections between the various system users.

The mobile phone 1000 preferably includes a transceiver 1010, a plurality of antennas 1012-1014, a digital camera 1040, a user detection module 1020, a proximity detector 1022, a relationship manager 1024, an alert generator 1026, an instant messenger application 1028, a display generator 1030 coupled to a display screen 1032, a scheduling module 1034, memory 1050 with a list of contacts, and an optical character recognition (OCR) module 1042.

The set of antennas includes a BLUETOOTH™ antenna 1012 and WIFI™ antenna 1013, and may further include a GPS antenna 1014. The antennas 1012-1013 are generally coupled to a transceiver 1010 configured to transmit and receive signals using applicable protocols know to those skilled in the art. These signals are monitored and processed by the user detection module 1020 to discover other users in the immediate proximity of the user. Since BLUETOOTH™ signals generally have a range of about 30-100 meters, these other users can generally be detected when they are less than 100 meters from the mobile phone 1000, although the effective distance may be less if there are obstructions in the environment. As described above, collocated users are affirmatively detected when a discovery message is transmitted to or received by the mobile phone 1000.

Thereafter, the proximity detector 1022 estimates the distance to the collocated user and the relationship manager 1024 determines whether the sender is a known contact retained in the contacts database 1050 or a new acquaintance. If the contact is a person of interest to the user based on an alert configured by the user, the alert generator 1026 produces an audible or visual notification to make the user aware of the presence or proximity of this person of interest. If the other user is a known contact, or becomes a known contact through the proximity discovery system, the users may then communicate directly with one another via an instant messenger app or social media platform, as described above. Connected users may also use the scheduling module 1034 to organize and calendar meetings. In some embodiments, the proximity detector system enables the user to set a reminder to follow-up with a new contact once connected. When the follow-up reminder occurs, the user receives a push notification on their mobile device, and an email is automatically drafted to send to the other user as a follow-up. Users are able to choose from a number of templated emails for this follow-up email process. In this way, the entire networking process from meeting, to exchanging information, to following-up is easily completed with the proximity detector system.

Each collocated person detected by the mobile phone 1000 is represented on the proximity graphic (see FIG. 2) produced by the display generator 1030 and presented to the user via an LCD display 1032, for example.

In some embodiments, the proximity discovery system further includes and OCR module 1042 configured to scan photos of business cards, extract relevant information, and automatically compile that biographical and professional information in a database of known contacts.

As can be appreciated, the present invention presents a number of advantages over the prior art. The proximity discovery system enables a user to discover people that are in the presence of the user, not miles away, at any given moment in time. And once the users have discovered each other, they may share biographical and professional information with little to no effort. They may also communicate via social media and schedule meetings with maximum convenience and minimal data entry using email, for example. Prior art methods fail to provide this same level of localization, speed, or convenience.

The system can take the form of an entirely hardware embodiment, an entirely software embodiment or an embodiment containing both hardware and software elements. In one embodiment, the system is implemented in software, which includes but is not limited to firmware, resident software, microcode, etc.

Furthermore, the system can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Described above, aspects of the present application are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. The internet 20 can include a plurality of local area networks ("LANs") and a wide area network ("WAN") that are interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet comprises a vast number of such interconnected networks, computers, and routers.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HTML, or other markup languages, that are electronically stored at or dynamically generated by "WWW sites" or "Web sites" throughout the Internet. Additionally, client-side software programs that communicate over the Web using the TCP/IP protocol are part of the WWW, such as JAVA.®. applets, instant messaging, e-mail, browser plug-ins, Macromedia Flash, chat and others. Other interactive hypertext environments may include proprietary environments such as those provided in AMERICA ONLINE or other online service providers, as well as the "wireless Web" provided by various wireless networking providers, especially those in the cellular phone industry. It will be appreciated that the present application could apply in any such interactive communication environments, however, for purposes of discussion, the Web is used as an exemplary interactive hypertext environment with regard to the present application.

A website is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a website elsewhere on the Internet. Each hyperlink is assigned a URL that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA.®. programming language from SUN MICROSYSTEMS, for execution on a remote computer. Likewise, a web server may also include facilities for executing scripts and other application programs on the web server itself.

A remote access user may retrieve hypertext documents from the World Wide Web via a web browser program. A web browser, such as NETSCAPE'S NAVIGATOR.®. or MICROSOFT'S INTERNET EXPLORER, is a software application program for providing a user interface to the WWW. Upon request from the remote access user via the web browser, the web browser requests the desired hypertext document from the appropriate web server using the URL for the document and the hypertext transport protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A proximity discovery system comprising:
    a first user the first user device comprising:
        a proximity detector for identifying a second user device within a predefined proximity of the first user device;
        wherein the second user device is configured to generate a user interface that is populated with profile information from the second user device;
        a user detection module configured to:
            generate a discovery message to the second user device; and
            detect a discovery message from the second user device;
            wherein the discovery message comprises information that identifies a person of interest;
        a connection module configured to:
            transmit a first user profile; and
            receive a second user profile;
            wherein the first and second user profiles comprise biographic information; and
        an alert generator configured to produce a notification upon detection of the person of interest.

2. The proximity discovery system of claim 1, wherein the first user device further comprises:
    a camera for capturing a digital image of a card; and
    an optical character recognition (OCR) module configured to:
        extract an external set of information from the digital image;
        import the external set of information into a set of identifying information corresponding to the second user device; and
        retrieve a photo from a website if the external set of information comprises a website address.

3. The proximity discovery system of claim 1, wherein the alert generator is configured to detect the person previously determined by the user to be of interest within a range of approximately 100 meters and to alert the user upon detection of the person previously determined by the user to be of interest within a range of approximately 100 meters.

4. A proximity discovery system comprising a user device for exchanging professional information, the user device comprising:
    a user detection module for detecting discovery messages from one or more of a plurality of mobile devices;
    a proximity detector for detecting the one or more of the plurality of mobile devices that are within a predefined distance of; the user device; and
    a connection module for sharing the professional information with the one or more of the plurality of mobile devices based on one or more of a plurality of connection levels, wherein the plurality of connection levels are based on human social connections.

5. The proximity discovery system of claim 4, further comprising a display generator for generating a proximity graphic comprising a name and image for one or more people associated with the one or more of the plurality of mobile devices.

6. The proximity discovery system of claim 5, wherein the discovery messages are exchanged with the one or more of the plurality of mobile devices.

7. The proximity discovery system of claim 6, wherein the display generator displays an indicia indicating an estimate of a distance from the one or more of the plurality of mobile devices to the user device, wherein the indicia includes a first indicia for a strong signal strength; a second indicia for an intermediate signal strength; or a third indicia for a weak signal strength.

8. The proximity discovery system of claim 7, further comprising:
an alert generator configured to detect a mobile device of a pre-determined person of interest within a nearby distance from the one or more of the plurality of mobile devices, and to alert the one or more of the plurality of mobile devices that the mobile device of the pre-determined person of interest is nearby the one or more of the plurality of mobile devices.

9. The proximity discovery system of claim 8, further comprising:
a scheduling module configured to exchange messages with the one or more of the plurality of mobile devices, and configured to generate a time and location for one or more meetings.

10. The proximity discovery system of claim 9, further comprising a messenger module configured to transmit an instant message to the one or more of the plurality of mobile devices nearby the user device, and to receive an instant message from the one or more of the plurality of mobile devices nearby the user device.

11. The proximity discovery system of claim 10, further comprising an optical character recognition (OCR) module configured to process and extract data from a digital image of a business card.

12. A method of discovering a plurality of mobile devices in a proximity of a user device, the method comprising:
transmitting a first discovery message to one or more of the plurality of mobile devices;
receiving a second discovery message from the one or more of the plurality of mobile devices;
identifying a first user device that is in a predefined proximity of the one or more of the plurality of mobile devices;
communicating a set of profile information between the first user device and at least one of the one or more of the plurality of mobile devices based on one of a plurality of connection levels;
exchanging a meeting message with at least one of the one or more of the plurality of mobile devices;
generating a time and location for one or more meetings;
wherein the connections levels are based on social connections;
generating profile information on the first user device received from one or more of the plurality of mobile devices that are identified in the predefined proximity of the first user device; and
selecting profile information of a person to display.

13. The method of discovering a plurality of mobile devices of claim 12, further comprising:
generating a proximity graphic comprising:
a name and image for one or more people using the plurality of mobile devices within approximately 100 meters of the user device; and
indicia indicating an estimate of a distance from the user device to the one or more of the plurality of mobile devices.

14. The method of discovering a plurality of mobile devices of claim 13, wherein the indicia indicating the estimate of the distance from the user device to the one or more of the plurality of mobile devices includes a first indicia for a strong signal strength; a second indicia for an intermediate signal strength; or a third indicia for a weak signal strength.

15. The method of discovering a plurality of mobile devices of claim 12, further comprising:
detecting a person of interest that was pre-determine by a user nearby the user device; and
alerting the user of a proximity of the person of interest.

16. The method of discovering a plurality of mobile devices of claim 12, further comprising:
transmitting instant messages to at least one of the one or more of the plurality of mobile devices nearby the user device; and
receiving instant messages from at least one of the one or more of the plurality of mobile devices nearby the user device.

17. The method of discovering a plurality of mobile devices of claim 12, further comprising:
processing and extracting a name and identifying data from a digital image of a card using optical character recognition (OCR).

18. A method for virtual discovery of people in proximity of a user, comprising using the user's mobile device to:
transmit a first discovery message to any one or more of a plurality of mobile devices;
detect a second discovery message from any one or more of a plurality of mobile devices collocated with the user's mobile device;
estimate a distance from the user's mobile device to any one or more of the plurality of collocated mobile devices; and
graphically illustrate at least one collocated user on an interface of the user device to generate at least one illustrated collocated user; and
select at least one illustrated collocated user to transmit the user's profile to the at least one illustrated collocated user and launch a messenger application for exchanging messages between the user device and the at least one illustrated collocated user.

19. The method of claim 18, wherein the at least one illustrated collocated user has been previously detected by the user's mobile device within a predetermined period of time.

20. The method of claim 18, further comprising illustrating a plurality of people currently in proximity within a predetermined distance of the user's mobile device.

21. A proximity discovery system server comprising:
a data base of connections between a plurality of user devices, each of the plurality of user devices comprising:
a proximity detector for identifying a first user device within a predefined proximity of one or more of the plurality of user devices;
wherein at least one of the plurality of user devices is configured to generate a user interface, the user interface including profile information from at least one of the plurality of user devices;
a user detection module configured to:
generate a discovery message to another mobile device; and
detect a discovery message from the another mobile device;
wherein the discovery message comprises information that identifies a person;
a connection module configured to:
transmit a first user profile; and
receive a second user profile;
wherein the first and second user profiles comprise biographic information; and an alert generator configured to detect a person previously determined by a user to be of interest.

22. The proximity discovery system server system of claim 21, wherein the profile information from at least one of the plurality of user devices comprises profile information of a user previously detected by the user's mobile device within a predetermined period of time.

\* \* \* \* \*